March 14, 1933.  G. A. REINHARDT ET AL  1,901,192
APPARATUS FOR MEASURING TEMPERATURES OF MOVING BODIES
Filed Feb. 20, 1929
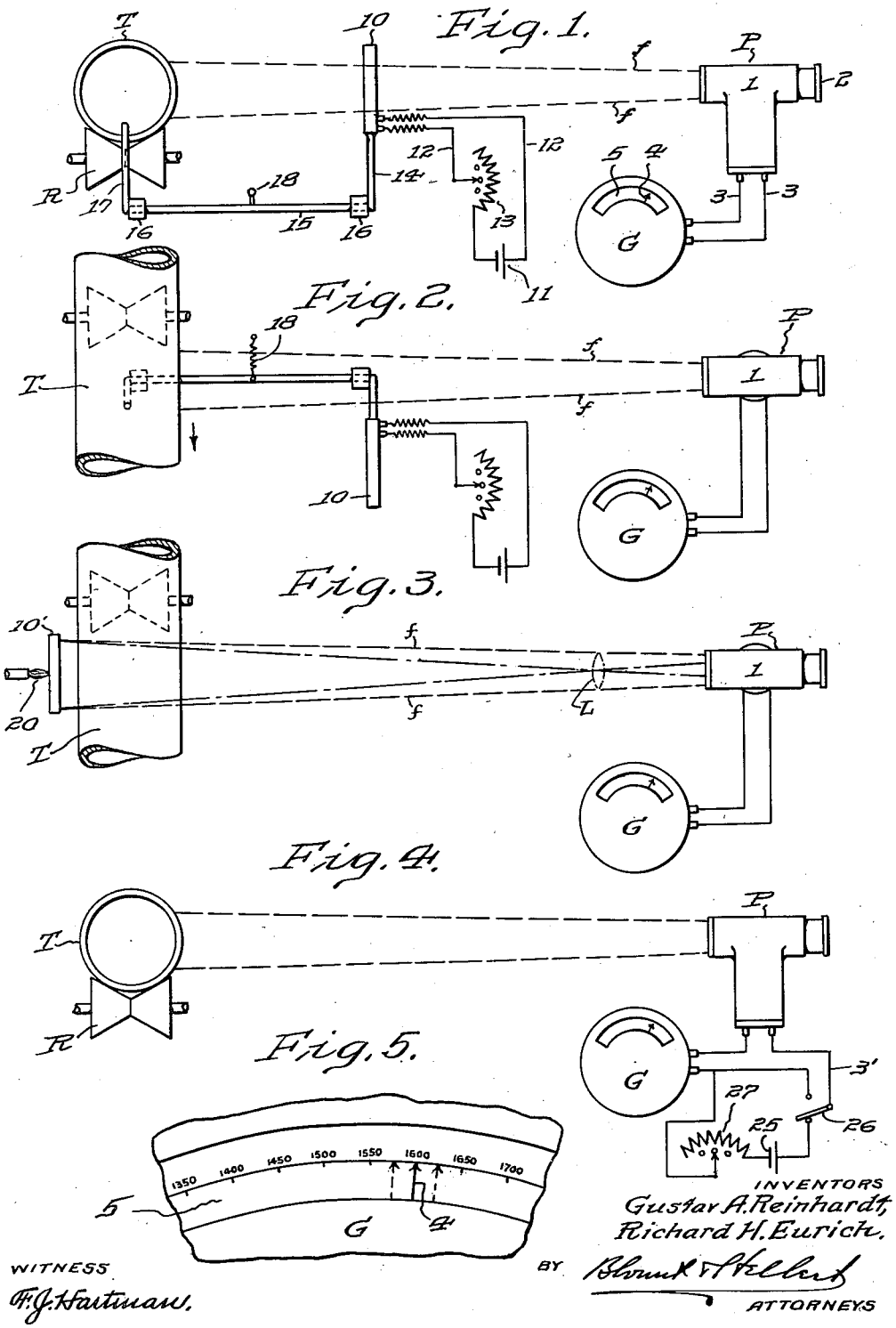

Patented Mar. 14, 1933

1,901,192

UNITED STATES PATENT OFFICE

GUSTAV A. REINHARDT AND RICHARD H. EURICH, OF YOUNGSTOWN, OHIO, ASSIGNORS TO BACHARACH INDUSTRIAL INSTRUMENT COMPANY, OF PITTSBURGH, PENNSYLVANIA

APPARATUS FOR MEASURING TEMPERATURES OF MOVING BODIES

Application filed February 20, 1929. Serial No. 341,332.

The temperature of hot bodies is frequently ascertained by the use of a radiation pyrometer, an instrument so constructed that when the body is brought into its field, a direct reading of the temperature of the body may be obtained from a galvanometer or milliammeter which is calibrated in degrees of temperature and forms a part of the apparatus; such pyrometers usually embody a thermo-couple which, when acted upon by the heat rays emanating from the body generates a minute electric current which actuates the galvanometer so as to move the hand thereof to the proper point on the scale to indicate the temperature of the body. However, there is a considerable elapse of time or lag between the instant when the body is first brought into the field of the instrument and the time when the latter indicates the true temperature of the body due to the time required both to raise the thermo-couple to its ultimate temperature and to move the hand to that point on the scale which indicates the true temperature of the body.

This lag, which is ordinarily of several seconds' duration, is not seriously objectionable when measuring the temperature of stationary bodies but is a matter of serious disadvantage when measuring the temperature of rapidly moving ones such as hot tubes, sheets, bars or the like as they are ejected from heating furnaces. In fact, it frequently happens under modern manufacturing conditions that the heated body moves so rapidly through the field of the pyrometer as to pass entirely through the same before the lag in the instrument is taken up with the result that an incorrect temperature reading is obtained, the hand of the galvanometer being unable to reach that point on the scale which indicates the true temperature before the hot body has passed out of the field of the instrument. Thus it is frequently impossible to satisfactorily utilize radiation pyrometers for measuring the temperature of these rapidly moving bodies without unduly reducing their rate of travel with consequent slowing down of production.

A principal object of our invention, therefore, is to provide a novel apparatus for measuring the temperature of moving bodies by means of which the objectionable lag to which we have referred may be reduced to a negligible minimum.

Other objects, advantages, operations and novel features of construction and arrangement comprehended by our invention are hereinafter more specifically pointed out or will be apparent from the following description of the apparatus.

In the practice of our invention we employ any suitable form of radiation pyrometer, these instruments usually comprising a housing in which is disposed a thermo-couple adapted to receive and be acted upon by the heat rays emanating from the object whose temperature is to be measured; the thermo-couple is in circuit with a galvanometer, milliammeter or other measuring instrument generally calibrated in degrees of temperature and thus adapted to give a direct indication or reading proportional to the current generated by the thermo-couple which, in turn, is proportional to the temperature of the body. Instruments of this general character being well understood and in common use, no further description thereof is required.

When the pyrometer is utilized for measurement of the temperature of moving objects, the instrument is generally held in a stationary position and focused on the path of the object so that the latter will move across the field of the instrument; thus very shortly after the body enters that field the thermo-couple is initially energized and the indicating hand of the galvanometer starts to move so that if the body remains in the field for a sufficient time to overcome the lag of the instrument the true temperature of the body is indicated on the galvanometer scale, but if the body passes out of the field of the instrument before the lag is overcome, the maximum reading of the galvanometer will indicate less than the true temperature of the body.

In accordance with our invention we reduce the lag of the instrument by normally maintaining the instrument in a condition in which it indicates a temperature approximating that of the body whose temperature is to be ascertained, and which is usually roughly known in advance, so that when said body is introduced into the field of the instrument the change in the latter required to indicate the true temperature of the body instead of that previously indicated is so small that the time required therefor is substantially negligible. In consequence, a true indication of the temperature of the body is afforded by the instrument almost as soon as the body enters the field instead of only after a material time interval, or in other words the lag of the instrument is so reduced in accordance with our invention that an almost instantaneous reading of the true temperature of a hot moving body may be obtained.

To enable those skilled in the art to readily understand and practice the invention, we will now describe certain forms of apparatus adapted therefor and as diagrammatically illustrated in the accompanying drawing, in which Fig. 1 is a side elevation of one form of said apparatus and Fig. 2 a top plan view thereof; Fig. 3 is a similar view of a form of apparatus of the general character of that shown in the preceding figures but of slightly modified construction; Fig. 4 is a side elevation of still another and somewhat different form of apparatus and Fig. 5 an enlarged fragmentary front view of a portion of the indicating scale and hand of any of the galvanometers or other indicating instruments shown in the preceding figures. For convenience of illustration the galvanometers in all of the said figures are faced toward the observer and like symbols of reference are used to designate corresponding parts in all of them.

As will hereinafter be apparent, the object of our invention may be accomplished either by normally maintaining in the field of the instrument a hot body, which we may conveniently term a target, so positioned and of such temperature as to cause the galvanometer to normally indicate a temperature approximating that of the moving bodies to be measured or by normally energizing the thermo-couple of the instrument from an independent current to effect the same result; the forms of apparatus shown in the first three figures of the drawing are designed to operate in accordance with the first of these principals and the form shown in Fig. 4 to operate in accordance with the second.

For convenience of description we will refer to the employment of our invention in the measurement of the temperature of a tube as it progressively moves through the field of the instrument, for example, as it is discharged from a heating furnace, but it will be of course understood that the invention is equally applicable to the measurement of the temperature of other moving bodies or, under certain conditions, of stationary bodies or of those which instead of moving transversely across the field of the instrument are momentarily introduced thereto from one direction and then withdrawn therefrom in the opposite direction.

Referring now more particularly to the apparatus shown in Figs. 1 and 2, P indicates the pyrometer instrument proper which may, in the ordinary manner, comprise a housing 1, an eyepiece 2 through which may be sighted on the object whose temperature is to be measured and a thermo-couple (not shown) disposed in the housing and connected by wires 3 with a galvanometer G or other suitable indicating mechanism having the usual indicating hand 4 arranged to traverse a scale 5 desirably calibrated in degrees of temperature. These several elements in one form or another are commonly found in radiation pyrometers and require no further description as they may be of any desired character. Under ordinary conditions the pyrometer is suitably supported on a stand or the like (not shown) and is so directed that the object or body whose temperature is to be measured will pass through its field which is indicated as included between the broken lines $f$—$f$.

The body, whose temperature is to be measured, for example a tube T, may be arranged to move transversely across the field on rollers R or other suitable supports during its passage from one point to another as for example from a heating furnace to a welding or forming machine whereby the heat rays emanating from the body as it moves through the said field will actuate the thermo-couple of the pyrometer and thus, through the minute current thereby generated, cause the hand 4 to indicate the temperature of the body on the galvanometer scale 5.

At some suitable point in the field of the instrument, for example, between the latter and the path of the tube T as shown in Figs. 1 and 2, we dispose a target 10 and provide means for maintaining this target at certain temperature so that, when directed thereon, the pyrometer will register a temperature approximating that of the body whose temperature is to be measured. The target may be of any suitable construction, for example, a disk-shaped casing containing a heating element connected with a battery 11 by wires 12, a rheostat 13 being desirably interposed in the circuit so that the temperature of the target may be regulated, or the target may be in the form of a solid plate heated by a flame, or may comprise a suitably heated grid, or consist of an especially constructed electric lamp having a ribbon filament or, in fact, may comprise other suitable means, as for instance an iris diaphragm or lens, which, when interposed in the field of the instrument, will cause the latter to indicate a temperature approximating that of the body whose temperature is to be measured. However, when the target is interposed between the body and the pyrometer some means must be provided for interrupting the influence of the target on the field while the temperature of the body is being indicated since it is not the sum or average of the temperatures of the target and of the body which is desired but only of the latter and, preferably, the said means are so constructed as to be automatically actuated by the movement of the body itself. Thus, as indicated in Figs. 1 and 2, the target may be mounted on an arm 14 at one end of a rotatable shaft 15 supported in journals 16 and having at its opposite end a finger 17 projecting into the path of the body, a spring 18 being arranged in such manner as to normally hold the target upright and in the field of the instrument. Thus as the body, for example the tube T, moves along its path in the direction of the arrow in Fig. 2, it will engage the finger substantially as it enters the field of the instrument and through its further movement swing the target out of the field and hold it in that position so long as the tube is passing through the field. In Fig. 1 we have shown the parts in their normal position with the tube approaching the finger while in Fig. 2 we have shown the tube as fully within the field with the target swung out of and to one side of the latter through engagement and depression of the finger by the tube, in which position the target is retained until the rear end of the tube clears the finger when the spring 18 will again pull the target back to normal position. However, if desired, any other means for moving the target out of the field automatically either through the movement of the body whose temperature is to be measured or otherwise may be employed if preferred or the target may be removed manually from the field or its influence thereon otherwise suitably negatived at the proper time. When the target is connected with a battery or other source of current by wires 12 or the like, the wires, of course, should have sufficient slack to permit the requisite movement of the target.

In the form of the invention shown in Fig. 3 the target, instead of being located between the instrument and the body whose temperature is to be measured, is located on the opposite side of the path of the latter which thus passes between the target and the instrument. Under these conditions the target may be stationary since the interposition of the body between the target and the instrument is effective to intercept the heat rays emanating from the target. In Fig. 3 we have shown the target as merely consisting of a solid plate 10' heated by a regulatable gas flame 20 impinging on the back of the target but electrical or, in fact, any other suitable means of regulating the amount or intensity of the heat energy from the target which reaches the thermo-couple may be utilized.

Reference will now be made to the operation of those forms of our apparatus which we have heretofore described: The instrument P is first directed on the path of the tube T or other body whose temperature is to be measured so that when it passes along said path it will traverse the field of the instrument and the target 10 next interposed in said field if it is not already permanently located therein as in the form of the invention shown in Fig. 3 and then raised to and maintained at such a temperature as will cause the hand 4 of the galvanometer to indicate a temperature on the scale thereof approximating that of the body whose temperature is to be measured, and which, as above stated, is ordinarily substantially known in advance. Thus assuming the temperature of the body will be somewhere between 1550° F. and 1650° F., the temperature of the target is so regulated as to maintain the indicating hand 4 approximately at the mean of these temperatures, that is, at approximately 1600°; the condition of the apparatus when adjusted to this initial or predetermined temperature, whatever it may be for any given case, may, for convenience, be termed the normal condition. Thus when the object whose temperature is to be measured is projected into the field of the instrument and the target removed therefrom, the instrument almost instantaneously adjusts itself so as to indicate the true temperature of the object since such adjustment requires at most but a very small change in the current delivered by the thermo-couple and a correspondingly small movement of the indicating hand in one direction or the other from its initial or normal position. For example, if the true temperature of the object is 1575° F. the hand will only have to move 25° from its normal position to record that temperature or, equally so, if the temperature of the object is 1625° F. it will only have to move 25° in the opposite direction from its normal position to give the proper reading. These several positions of the indicating hand are illustrated in Fig. 5 in which the hand is shown in full lines in normal position at 1600° F. and in dotted lines respectively as indicating 1575° F. and 1625° F., the relatively small arc through which it must travel to attain either of these positions from its normal position in comparison with the whole length of the scale being readily apparent.

So long as the moving body or other mass whose temperature is to be measured remains in the field of the instrument, the indicating hand of course remains at the point on the scale which indicates its temperature; however, as soon as the body passes out of the field, the target is either automatically or manually returned thereinto and the indicating hand thereby caused to once more assume its normal position as dictated by the energy of the target.

It is thus apparent that in accordance with our invention the apparatus is normally maintained in a condition in which the thermo-couple and other elements require but a very minute readjustment to properly indicate the true temperature of the body whose temperature is to be measured with the result that both electrical and mechanical lag of the pyrometer is substantially eliminated and the true temperature of the body correctly indicated in a substantially negligible interval of time after the body has been brought into the field of the instrument; thus even though the body is moved through the field with extreme rapidity a substantially correct reading or indication of its temperature may be obtained.

Under certain circumstances it may be found desirable to employ some form of shielding means between the target and the pyrometer to control the effect upon the pyrometer of the heat energy emanating from the target. Thus in Fig. 3 we have indicated in dot and dash lines a lense or iris diaphragm L disposed between the pyrometer and the target in such position as to modify the effect of the heat energy of the latter; under these conditions the target may be kept at a temperature higher than would be ordinarily required in the absence of the shielding means, and the latter so arranged or adjusted as to reduce the heating effect on the thermo-couple of the pyrometer to the proper extent to cause the galvanometer to indicate the desired initial temperature. Desirably the shielding means are made readily adjustable in any suitable way so that the shielding effect produced may be conveniently modified or controlled, and, of course, when said means are disposed between the target and the path of the body whose temperature is to be measured, suitable means are preferably provided for removing the shield from the field of the pyrometer or otherwise negativing its influence on the latter while the actual measurement is being accomplished.

In the form of apparatus shown in Fig. 4, the target is omitted and electrical means provided for maintaining the indicating hand at the desired normal reading. To this end, as shown in said figure, a battery 25 or other suitable source of current is provided and one of the wires 3′ from the thermo-couple connected therewith through a switch 26, and the other side of the battery connected, preferably through a rheostat 27 for controlling the flow of current, with one of the poles of the galvanometer; the other pole of the galvanometer is connected with the other wire 3 from the thermo-couple while the first pole is also connected with the switch 26, the arrangement being such that when the switch is thrown in one direction as shown in Fig. 4 the thermo-couple, galvanometer, rheostat and battery will be included in the same circuit but when the switch is thrown in the other direction the galvanometer and thermo-couple alone will be included therein. Thus under the first condition the battery current flowing in the circuit is operative to hold the indicating hand at the desired normal indication, for example 1600°, but when the switch is thrown so as to cut out the battery and directly connect the galvanometer with the thermo-couple, the heat rays emanating from the body whose temperature is to be measured energize the thermo-couple in the ordinary way. Thus when using an apparatus of this kind, the desired normal reading or adjustment of the galvanometer is maintained by causing the battery current to flow through the thermo-couple and regulating this current by means of the rheostat 27 until introduction into the instrument field of the body whose temperature is to be measured when the switch 26 is thrown, either automatically or manually, so as to cut out the battery and directly connect the galvanometer with the thermo-couple; as the current generated in the thermo-couple by the action of the emanated heat rays thereon substantially approximates that which has theretofore been delivered by the battery, the galvanometer and thermo-couple almost instantaneously conform themselves to the new condition and thus indicate the true temperature of the body without objectionable lag or loss of time.

It will thus be apparent that we have provided a novel apparatus for measuring the temperature of heated bodies which is of particular advantage in those cases where the body is passed through the field of the measuring instrument very rapidly or else after being introduced therein is quickly withdrawn therefrom. However, while the several forms of apparatus we have disclosed herein are all satisfactorily operative for the performance of their intended functions, we do not desire or intend to confine ourselves specifically thereto or to any precise details of construction and arrangement of the various elements comprised therein as the same are capable of modification in numerous particulars without departing from the spirit and scope of the invention as defined by the appended claims.

Having thus described our invention we claim and desire to protect by Letters Patent of the United States:

1. In combination with a radiation pyrometer, means for causing the pyrometer to normally indicate a temperature approximating that of a body whose temperature is to be measured and means for rendering said first-mentioned means ineffective upon the pyrometer when the body whose temperature is to be measured is introduced into its field.

2. In combination with a radiation pyrometer, means operative to cause the pyrometer to normally indicate a temperature approximating that of a body whose temperature is to be measured but in the absence of said body and means for negativing the influence of said first mentioned means on the pyrometer whereby when the body is interposed in the field of the pyrometer after such negation the time required for the pyrometer to indicate the true temperature thereof is minimized.

3. In combination with a radiation pyrometer, means operative to cause the pyrometer to indicate a temperature approximating that of the body whose temperature is to be measured but prior to the making of such measurement, means for rendering said first mentioned means inoperative on the pyrometer and means for then introducing the said body into the pyrometer field whereby the internal lag of the pyrometer precedent to its indication of the temperature of the body is minimized.

4. In combination with a heat affected heat-measuring device and means for bringing articles successively into position for measurement of their temperatures by said device, a heater to maintain a desired temperature of said device during intervals between the arrivals of the successive articles in said position and means whereby said articles interrupt the operation of said heater upon arrivals of said articles in said position.

5. In combination in apparatus for measuring the temperatures of a series of heated bodies, which are moved along in spaced relation on a conveyor, a thermo-electric radiation pyrometer adjacent the conveyor with its line of heat reception extending transversely thereof, a heating element positioned so that the heat therefrom will act effectively upon the pyrometer, indicating means operated by the current changes induced in the pyrometer, and means for governing the temperature of the heating element including switch devices actuated by the moving bodies.

6. In combination in apparatus for measuring the temperature of a series of heated bodies which are moved along in spaced relation on a conveyor, a measuring instrument which is responsive to radiant energy and in which such radiant energy generates an electro motive force located adjacent the conveyor with its line of radiant energy reception extending transversely thereof, energizing means other than the heated bodies for causing the instrument to register to approximately the same extent as the heated bodies, indicating means operated by current changes induced in the instrument, and means for governing the actuation of said energizing means including switch devices actuated by the moving bodies.

In witness whereof, we have set our hands this 18th day of February, 1929.

GUSTAV A. REINHARDT.
RICHARD H. EURICH.